United States Patent
Kobayashi et al.

(10) Patent No.: US 9,046,441 B2
(45) Date of Patent: Jun. 2, 2015

(54) COLLISION TEST APPARATUS, VEHICLE DESIGN METHOD, AND VEHICLE

(75) Inventors: Isao Kobayashi, Susono (JP); Taisuke Fujiwara, Toyota (JP); Shunichi Katsumata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 13/978,008

(22) PCT Filed: Jan. 11, 2012

(86) PCT No.: PCT/IB2012/000022
§ 371 (c)(1),
(2), (4) Date: Jul. 2, 2013

(87) PCT Pub. No.: WO2012/095723
PCT Pub. Date: Jul. 19, 2012

(65) Prior Publication Data
US 2013/0283902 A1 Oct. 31, 2013

(30) Foreign Application Priority Data
Jan. 12, 2011 (JP) ................................. 2011-004310

(51) Int. Cl.
*G01M 17/007* (2006.01)

(52) U.S. Cl.
CPC ................................ *G01M 17/0078* (2013.01)

(58) Field of Classification Search
CPC ................................................ G01M 17/0078
USPC ........... 73/12.04, 12.07, 12.09, 118.01, 865.3
See application file for complete search history.

(56) References Cited

U.S. PATENT DOCUMENTS

| 5,483,845 A * | 1/1996 | Stein et al. .................... 73/865.3 |
| 5,485,758 A | 1/1996 | Brown et al. |
| 5,623,094 A * | 4/1997 | Song et al. .................... 73/12.07 |
| 5,872,321 A * | 2/1999 | Yannaccone ................. 73/865.3 |
| 6,035,728 A | 3/2000 | Jost |
| 6,561,007 B1 * | 5/2003 | Bock et al. .................... 73/12.01 |
| 7,543,475 B2 * | 6/2009 | Rieser et al. ................. 73/12.07 |
| 7,610,821 B2 * | 11/2009 | Klein ........................... 73/865.3 |
| 2005/0081656 A1 * | 4/2005 | Saari et al. .................... 73/865.3 |
| 2007/0251295 A1 | 11/2007 | Rieser et al. |
| 2008/0016970 A1 | 1/2008 | Klein |

FOREIGN PATENT DOCUMENTS

| JP | A-7-215246 | 8/1995 |
| JP | A-8-240509 | 9/1996 |
| WO | WO 97/46859 A1 | 12/1997 |
| WO | WO 2005/121742 A1 | 12/2005 |

* cited by examiner

Primary Examiner — Freddie Kirkland, III
(74) Attorney, Agent, or Firm — Oliff PLC (57) ABSTRACT

A collision test apparatus includes actuators that move a vehicle structural member toward the side of a carrying unit on which a dummy is carried. The actuators can be driven independently of each other. Therefore, the actuators move the vehicle structural member at respectively different driving speeds. In other words, the collision test apparatus does not simply move the vehicle structural member such that the vehicle structural member collides with the dummy, but also causes the vehicle structural member to collide with the dummy while moving the vehicle structural member at different speeds in different positions.

6 Claims, 10 Drawing Sheets

| SITE | PLAN VIEW | FRONT VIEW | 3D BEHAVIOR |
|---|---|---|---|
| Fr DOOR | | | H.P. LINE INTRUDES |
| | | | WAIST PORTION INTRUDES |
| | | | TRANSLATION |
| Rr DOOR | | | THIGH PORTION INTRUDES |
| | | | TRANSLATION |
| B PILLAR | | | WAIST PORTION INTRUDES |
| | | | TRANSLATION |

COLLISION TEST APPARATUS, VEHICLE DESIGN METHOD, AND VEHICLE

BACKGROUND OF THE INVENTION

1. Field of the Invention

The invention relates to a collision test apparatus, a vehicle design method, and a vehicle.

2. Description of Related Art

A conventional collision test apparatus is disclosed in Japanese Patent Application Publication No. 07-215246 (JP-A-07-215246), for example. This collision test apparatus includes a target sled on which a dummy and a door structure of a vehicle are disposed, and a bullet sled that inputs a load into the door structure. A seat on which the dummy is carried and the door structure that is adjacent to an outer side of the seat are disposed on the target sled. During a test, the bullet sled moves toward the target sled and collides with the door structure. The door structure activates an airbag and collides with the dummy.

When a collision test is performed by simulating a vehicle collision, it is necessary to reproduce a state close to an actual collision. However, an ability of a conventional collision test apparatus to reproduce an actual collision is low. When the reproduction ability of the collision test apparatus is low, test results (a full body injury value of the dummy and so on, for example) differ from results obtained in an actual collision. Hence, there is demand for an improvement in the reproduction ability of a collision test apparatus.

SUMMARY OF THE INVENTION

The invention provides a collision test apparatus capable of simulating a vehicle collision at a high level of reproduction, a vehicle design method, and a vehicle designed using the vehicle design method.

A first aspect of the invention relates to a collision test apparatus that simulates a vehicle collision by causing a collision between a dummy and a vehicle structural member. The collision test apparatus includes: a carrying unit on which the dummy is carried; and an input unit that moves the vehicle structural member toward the carrying unit side, wherein the input unit is provided in a plurality, and the plurality of input units are driven independently of each other.

In an actual vehicle collision, a vehicle structural member (a door, a pillar, and so on, for example) of a damaged vehicle moves at different intrusion speeds in different positions. In the aspect described above, the input unit is provided to move the vehicle structural member toward the side of the carrying unit carrying the dummy. Further, the input unit is provided in a plurality, and the plurality of input units can be driven independently. Accordingly, the plurality of input units are capable of moving the vehicle structural member at respectively different driving speeds. For example, when the driving speed of one input unit is high and the driving speed of another input unit is low, the intrusion speed of a location of the vehicle structural member corresponding to the former input unit increases while the intrusion speed of a location corresponding to the latter input unit decreases. In other words, the collision test apparatus is capable not only of simply moving the vehicle structural member such that the vehicle structural member collides with the dummy, but also of causing the vehicle structural member to collide with the dummy while moving at different speeds in different positions. As a result, a vehicle collision can be simulated at a high level of reproduction.

In the aspect described above, the collision test apparatus may further include a sled carriage that moves in a predetermined direction and a fixing unit that fixes the vehicle structural member, the carrying unit may be provided on the sled carriage, the input unit may be constituted by an actuator that is driven in the predetermined direction and provided on the sled carriage, and the fixing unit may be supported by the plurality of input units.

In an actual vehicle collision, an entire vehicle body of the damaged vehicle moves when pushed by an oncoming vehicle, and a contact part between the vehicle structural member and the oncoming vehicle (or a peripheral part thereof) intrudes at different intrusion speeds in different positions. In the aspect described above, the dummy is moved to the vehicle structural member side of the fixing unit by inertial force when the sled carriage moves. It is therefore possible to reproduce effects brought about when the entire vehicle body of the damaged vehicle moves during a collision. Further, the input unit is constituted by an actuator that is driven in the predetermined direction in which the sled carriage moves. By driving the respective actuators to push the fixing unit at driving speeds corresponding to their positions, the vehicle structural member moves to the dummy side at intrusion speeds corresponding to their positions. Hence, intrusion speeds in respective positions of the vehicle structural member can be reproduced. As a result, a vehicle collision can be simulated at an even higher level of reproduction.

A second aspect of the invention relates to a collision test apparatus that simulates a vehicle collision by causing a collision between a dummy and a vehicle structural member. The collision test apparatus includes: a carrying unit on which the dummy is carried; and an input mechanism that moves the vehicle structural member toward the carrying unit side, wherein the input mechanism moves the vehicle structural member at different speeds in a horizontal direction intersecting a movement direction of the vehicle structural member.

In an actual vehicle collision, the vehicle structural member of the damaged vehicle intrudes at different intrusion speeds in a horizontal direction (a vehicle front-rear direction during a side-on collision, for example) intersecting a movement direction of the vehicle body. In the aspect described above, the input mechanism is capable of moving the vehicle structural member at different speeds in a horizontal direction intersecting the movement direction of the vehicle structural member. As a result, a vehicle collision can be simulated at a high level of reproduction.

A third aspect of the invention relates to a vehicle design method. The vehicle design method includes: implementing a collision test in which a vehicle structural member is caused to move toward a dummy such that the vehicle structural member collides with the dummy; evaluating a collision result obtained in the collision test; and designing a vehicle on the basis of the evaluation, wherein the vehicle structural member moves at different speeds in a horizontal direction intersecting a movement direction.

In an actual vehicle collision, the vehicle structural member of the damaged vehicle intrudes at different intrusion speeds in a horizontal direction (the vehicle front-rear direction during a side-on collision and a vehicle left-right direction during a head-on collision or a rear collision, for example) intersecting the movement direction of the vehicle body. In the aspect described above, the vehicle structural member moves at different speeds in a horizontal direction intersecting the movement direction, and therefore a vehicle collision can be simulated at a high level of reproduction during a collision test. As a result, more appropriate evaluations can be performed during the evaluation. By executing the collision test at a high level of reproduction and performing appropriate evaluations, a vehicle exhibiting a higher level of safety can be designed.

A fourth aspect of the invention relates to a vehicle. The vehicle is designed using the vehicle design method described above. By executing a collision test at a high level of reproduction and performing appropriate evaluations, the safety of the vehicle can be improved even further.

According to the invention, a vehicle collision can be simulated at a high level of reproduction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A preferred embodiment of a collision test apparatus according to the invention will be described in detail below with reference to the drawings.

Figure 1:
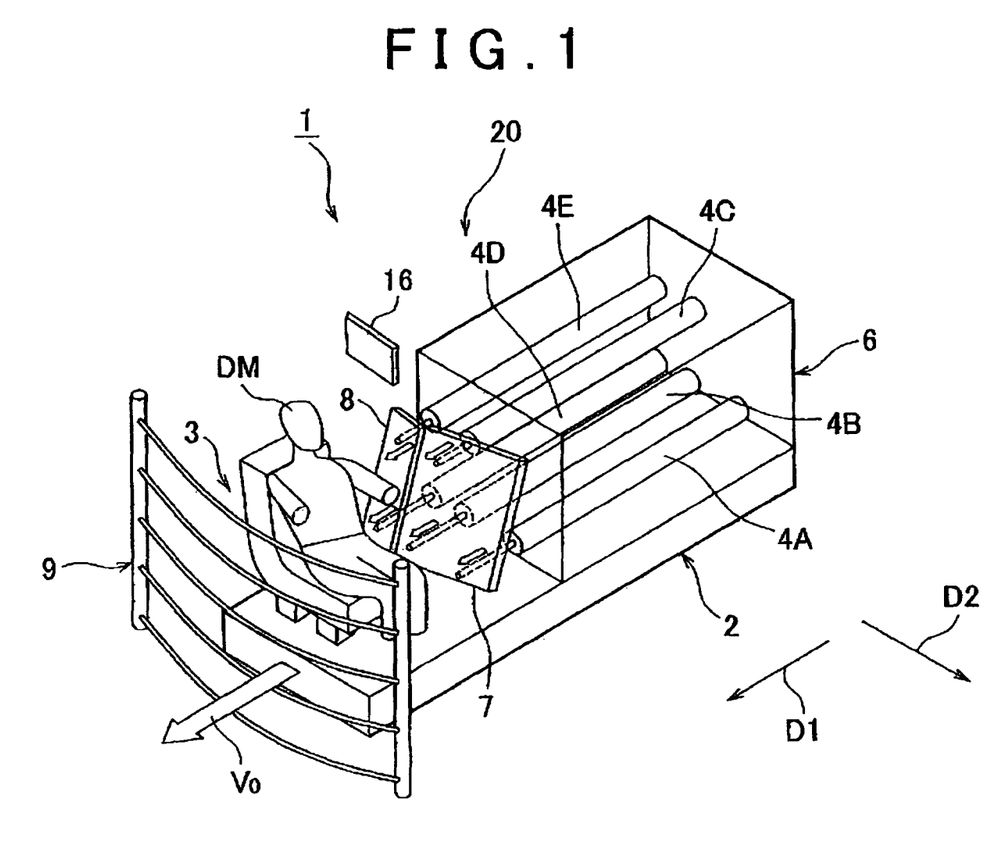
FIG. 1 is a perspective view of a collision test apparatus according to an embodiment of the invention.

A collision test apparatus 1 is capable of performing a collision test by simulating a vehicle collision. The collision test apparatus 1 shown in FIG. 1 simulates, as an example of a collision, a side-on collision in which an oncoming vehicle collides with a damaged vehicle from a lateral direction. As shown in FIG. 1, the collision test apparatus 1 includes a sled carriage 2, a carrying unit 3 on which a dummy DM is carried, actuators 4A, 4B, 4C, 4D, 4E, an actuator support unit 6, a door simulating jig (a fixing unit) 7, a pillar simulating jig (a fixing unit) 8, and a dummy protecting net 9.

Figure 2:
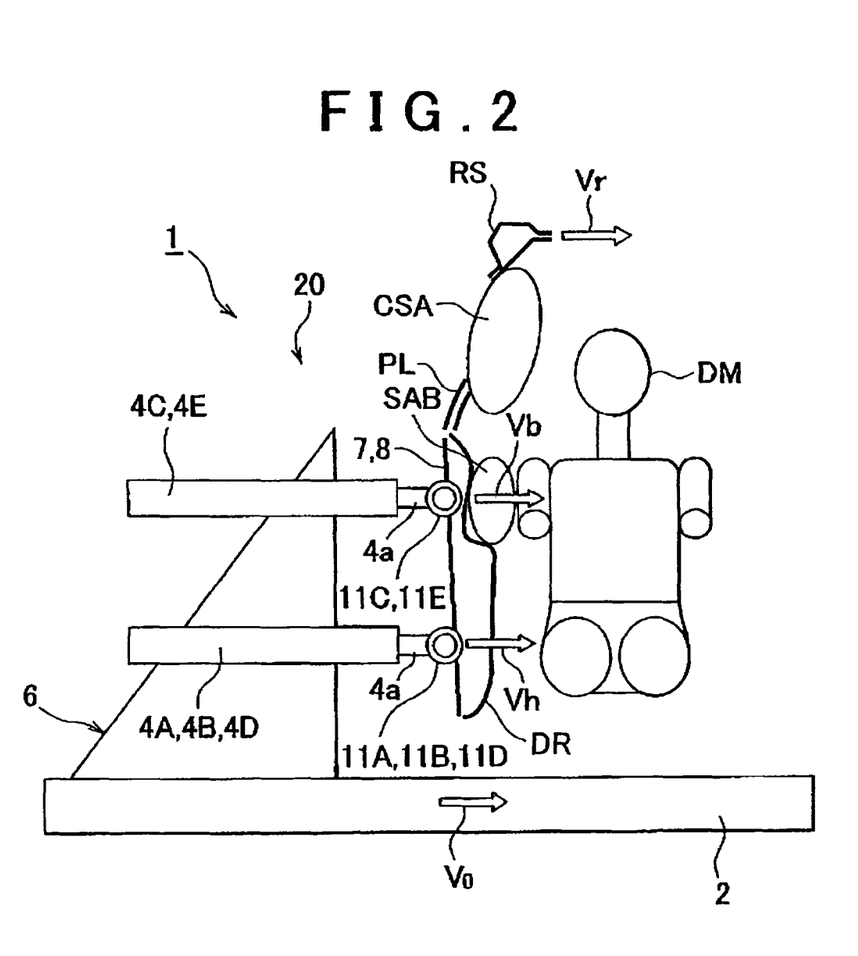
FIG. 2 is a schematic view showing the collision test apparatus from the front during a collision test.

A collision can be simulated with the collision test apparatus 1 by setting the dummy DM and a vehicle structural member during a test and causing the vehicle structural member to collide with the dummy DM. As shown in FIG. 2, examples of the vehicle structural member include a door DR, a B pillar PL, a side airbag (SAB), a curtain shield airbag (CSA), and a roof side rail (RS).

The sled carriage 2 moves in a movement direction (a predetermined direction) D1 of the damaged vehicle during the collision. The movement direction D1 of the damaged vehicle is equal to an intrusion direction of the oncoming vehicle. Note that a direction D2 in FIG. 1 indicates a vehicle front side. A carrying unit 3 is provided in a region on one side of an upper surface of the sled carriage 2. The carrying unit 3 is constituted by a seat simulating a seat provided in a vehicle interior. In this embodiment, the carrying unit 3 is set such that the dummy DM is oriented in the direction D2. When the sled carriage 2 moves in the movement direction D1, inertial force causes the dummy DM to perform a relative movement to the side of the vehicle structural members set on the door simulating jig 7 and the pillar simulating jig 8.

The actuators 4A, 4B, 4C, 4D, 4E function to move the vehicle structural members, such as the door and the pillar, to the carrying unit 3 side. The actuators 4A, 4B, 4C, 4D, 4E are driven independently of each other. In other words, the respective actuators 4A, 4B, 4C, 4D, 4E can be driven at different speeds and different strokes. The actuators 4A, 4B, 4C, 4D, 4E are constituted by intrusion actuators that can be driven to expand and contract in the movement direction D1. The actuators 4A, 4B, 4C, 4D, 4E are provided on the sled carriage 2 via the actuator support unit 6, which is fixed to an upper surface of the sled carriage 2. The actuator support unit 6 is constituted by a frame structure provided on the upper surface of the sled carriage 2. The actuators 4A, 4B, 4C, 4D, 4E are disposed such that a driving unit 4a expands toward the dummy DM. Ball joints 11A, 11B, 11C, 11D, 11E for connecting the actuators 4A, 4B, 4C, 4D, 4E to the door simulating jig 7 or the pillar simulating jig 8 are provided on respective movement direction D1 side end portions of the actuators 4A, 4B, 4C, 4D, 4E (see FIGS. 2 and 4).

Figure 4:
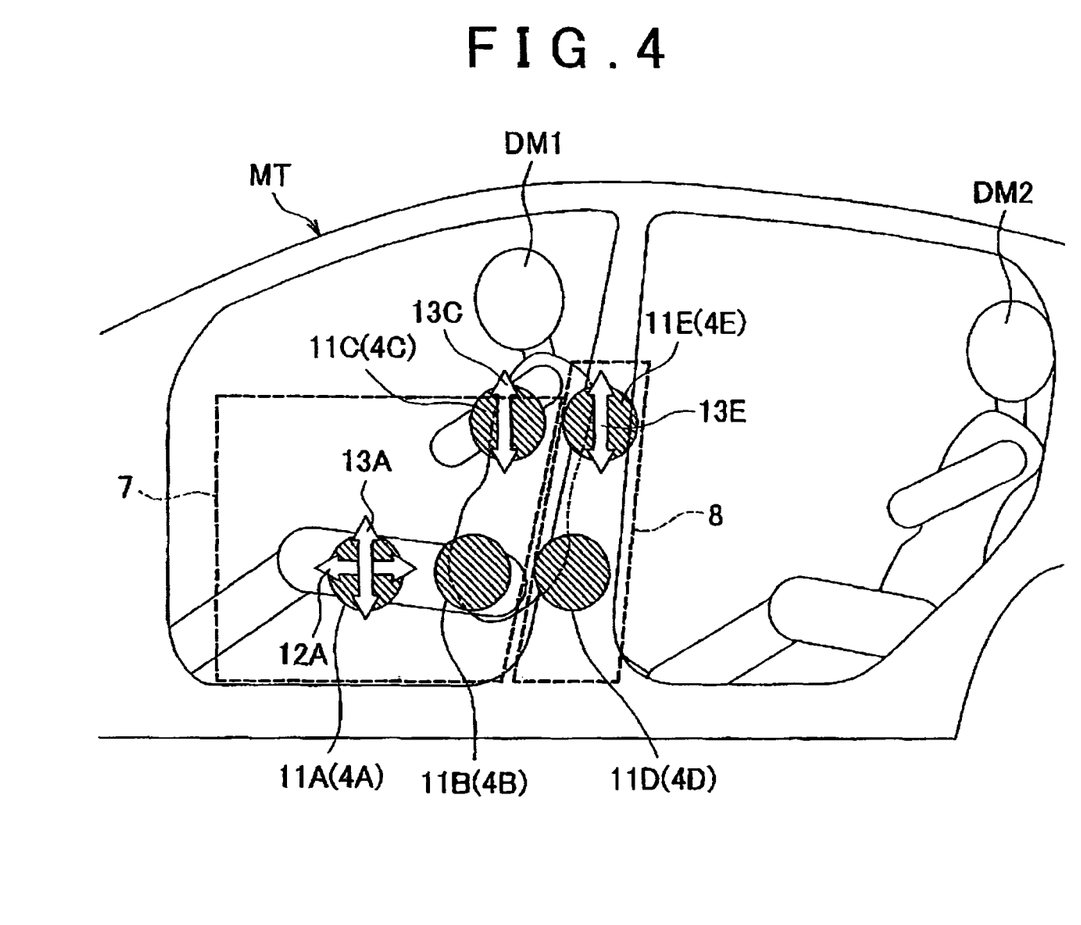
FIG. 4 is a view showing positional relationships of actuators.

FIG. 4 shows positions of the ball joints 11A, 11B, 11C, 11D, 11E relative to the dummy DM, or in other words positions of the actuators 4A, 4B, 4C, 4D, 4E seen from the vehicle lateral direction. Note that FIG. 4 shows a lateral structure of a simulated vehicle MT. As shown in FIG. 4, positions of the ball joints 11A, 11B, 11D (in other words, the actuators 4A, 4B, 4D) in a vehicle up-down direction are set at a height of a waist portion of the dummy DM. Positions of the ball joints 11C, 11E (in other words, the actuators 4C, 4E) in the vehicle up-down direction are set at a height of a chest portion of the dummy DM. A position of the ball joint 11A (in other words, the actuator 4A) in a vehicle front-rear direction is set further frontward (here, close to knees of the dummy DM) than a trunk portion of the dummy DM. A position of the ball joint 11B (in other words, the actuator 4B) in the vehicle front-rear direction is set in the vicinity of the waist portion of the dummy DM (a position of a rear end part of the door). A position of the ball joint 11C (in other words, the actuator 4C) in the vehicle front-rear direction is set in the vicinity of the chest portion of the dummy DM (the position of the rear end part of the door). A position of the ball joint 11D (in other words, the actuator 4D) in the vehicle front-rear direction is set in the vicinity of the waist portion of the dummy DM (a position of the B pillar). A position of the ball joint 11E (in other words, the actuator 4E) in the vehicle front-rear direction is set in the vicinity of the chest portion of the dummy DM (the position of the B pillar). In other words, a plurality of input units (the actuators) may include input units set in vehicle up-down direction positions at least at the height of the waist portion of the dummy and the height of the chest portion of the dummy.

Further, a sliding mechanism that slides in the vehicle front-rear direction and the vehicle up-down direction is provided in a connecting part between a predetermined actuator and the door simulating jig 7 or the pillar simulating jig 8 in order to facilitate reproduction of the behavior of the door and the B pillar during a collision test using actual vehicles. The sliding mechanism is constituted by a linear guide or an axial slider. More specifically, a sliding mechanism 12A capable of sliding in the vehicle front-rear direction and a sliding mechanism 13A capable of sliding in the vehicle up-down direction are provided in a connecting part between the actuator 4A and the door simulating jig 7. A sliding mechanism 13C capable of sliding in the vehicle up-down direction is provided in a connecting part between the actuator 4C and the door simulating jig 7. A sliding mechanism 13E capable of sliding in the vehicle up-down direction is provided in a connecting part between the actuator 4E and the pillar simulating jig 8.

The door simulating jig 7 is a jig for fixing a door (a vehicle structural member) used in a collision test. The door simulating jig 7 is formed from a flat plate that is supported by the movement direction D1 side end portions of the actuators 4A, 4B, 4C. The pillar simulating jig 8 is a jig for fixing a pillar (a vehicle structural member) used in a collision test. The pillar simulating jig 8 is formed from a flat plate that is supported by the movement direction D1 side end portions of the actuators 4D, 4E. By causing the vehicle structural member to collide with the dummy DM via the flat plate-shaped door simulating jig 7 and pillar simulating jig 8 in this manner, the level of reproduction of the test can be improved. More specifically, when the vehicle structural member is supported directly by the actuators 4A, 4B, 4C, 4D, 4E, a load input into the dummy DM from the vehicle structural member increases in actuator connection locations but escapes in other parts. When the vehicle structural member is caused to collide with the dummy DM while surface-supported by the door simulating jig 7 and the pillar simulating jig 8, on the other hand, the load can be transmitted to the dummy DM without escaping.

The dummy protecting net 9 functions to protect the dummy DM following a collision. The dummy protecting net 9 is fixed to the sled carriage 2 by an attachment structure, not shown in the drawings.

The sled carriage 2, the actuators 4A, 4B, 4C, 4D, 4E, the actuator support unit 6, the door simulating jig 7, and the pillar simulating jig 8 together constitute an input mechanism 20 that moves the set vehicle structural member to the dummy DM side. The input mechanism 20 is capable of moving the vehicle structural member at different speeds in the direction D2 intersecting the movement direction D1. More specifically, the input mechanism 20 can increase a vehicle rear side intrusion speed of the vehicle structural member by raising the driving speed of a rear side actuator in comparison with the vehicle front side. Alternatively, the input mechanism 20 can increase a vehicle front side intrusion speed of the vehicle structural member by raising the driving speed of a front side actuator in comparison with the vehicle rear side. Further, the input mechanism 20 can make the intrusion speeds of the vehicle structural member in the vehicle front-rear direction identical by making the driving speeds of the vehicle rear side and front side actuators identical.

The input mechanism 20 is also capable of moving the vehicle structural member at different speeds in the vehicle up-down direction. More specifically, the input mechanism 20 can increase a vehicle lower side intrusion speed of the vehicle structural member by raising the driving speed of a lower side actuator in comparison with a vehicle upper side. Alternatively, the input mechanism 20 can increase a vehicle upper side intrusion speed of the vehicle structural member by raising the driving speed of an upper side actuator in comparison with a vehicle lower side. Further, the input mechanism 20 can make the intrusion speeds of the vehicle structural member in the vehicle up-down direction identical by making the driving speeds of the vehicle upper side and lower side actuators identical.

Figure 3:
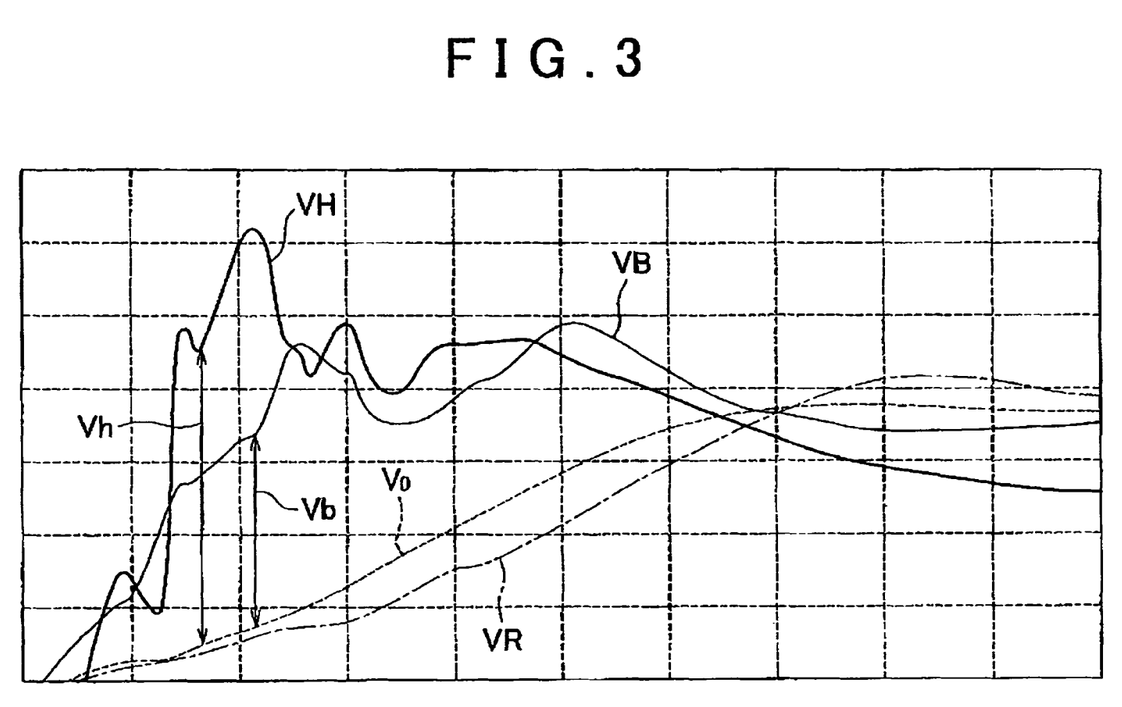
FIG. 3 is a graph showing a speed of a damaged vehicle and speeds of respective sites of the damaged vehicle during an actual vehicle test.

Next, referring to FIGS. 2 and 3, an example of a method of setting speeds in the input mechanism 20 will be described. FIG. 3 is a graph showing a speed of the vehicle body of the damaged vehicle and speeds of respective sites of the damaged vehicle during an actual vehicle test. An abscissa of FIG. 3 shows an elapsed time from the start of the collision, and an ordinate shows the speed. In FIG. 3, $V_0$ indicates a movement speed of the entire damaged vehicle. VR indicates a speed of the roof side rail of the damaged vehicle. VH indicates a speed of a part of the door (or the pillar) of the damaged vehicle corresponding to the height position of the waist portion of the dummy DM. VB indicates a speed of a part of the door (or the pillar) of the damaged vehicle corresponding to the height position of the chest portion of the dummy DM. As shown in FIG. 3, during an actual vehicle test, VH and VB are much higher than $V_0$ and VR at an initial stage of the collision.

As shown in FIG. 2, the vehicle structural member is set on the collision test apparatus 1. The door DR is fixed to the door simulating jig 7, and the B pillar PL is fixed to the pillar simulating jig 8. The roof side rail RS is fixed to the sled carriage 2. The roof side rail RS is fixed to the sled carriage 2 via a jig 16 (see FIG. 1) fixed to the sled carriage 2 or an attachment mechanism not shown in the drawings.

The speed of the sled carriage 2 is aligned with $V_0$, i.e. an identical speed to the movement speed of the damaged vehicle during the actual vehicle test. The roof side rail RS is fixed to the sled carriage 2, and therefore a speed Vr of the roof side rail RS is equal to $V_0$. In FIG. 3, $V_0$ and VR are substantially identical, and therefore $Vr=V_0$ is approximated in the collision test apparatus 1. A load applied to a head portion and a neck portion of the dummy DM by the collision test apparatus 1 is aligned with a load applied during the actual vehicle test by adjusting an initial gap between the head portion and the roof side rail RS on the basis of a stroke difference between $V_0$ and VR. In other words, a relative movement amount between the head portion and the curtain shield airbag CSA is aligned with that of the actual vehicle test.

The speed of the part of the door DR or the B pillar PL corresponding to the height position of the waist portion is aligned with the speed VH thereof during the actual vehicle test by compensating for a speed deficiency in the speed $V_0$ of the sled carriage 2 using a driving speed Vh of the actuators 4A, 4B, 4D. The speed of the part of the door DR or the B pillar PL corresponding to the height position of the chest portion is aligned with the speed VB thereof during the actual vehicle test by compensating for a speed deficiency in the speed $V_0$ of the sled carriage 2 using a driving speed Vb of the actuators 4C, 4E. As regards relationships between the speeds obtained in the actual vehicle test shown in FIG. 3 and the speeds obtained with the collision test apparatus 1, a difference between VH and $V_0$ corresponds to Vh, and a difference between VB and $V_0$ corresponds to Vb. Hence, in the collision test apparatus 1, the loads input into the chest portion and waist portion of the dummy DM are aligned with the loads input during the actual vehicle test.

Figure 5A:
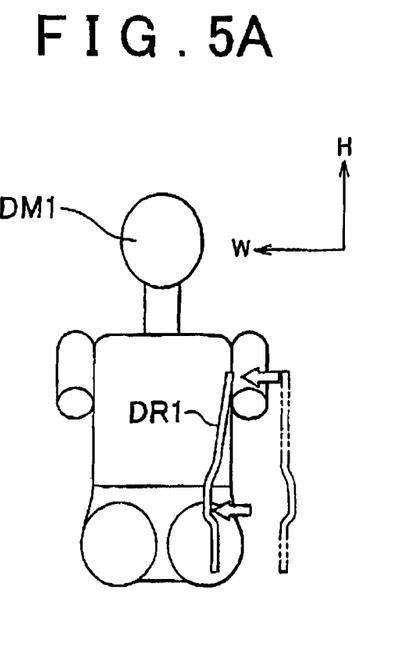
FIGS. 5A to 5C are front views showing examples of the manner in which a vehicle structural member of the damaged vehicle deforms during an actual vehicle test, FIG. 5A showing deformation of a front door inner lateral to a front seat dummy, FIG. 5B showing deformation of a B pillar inner, and FIG. 5C showing deformation of a rear door inner lateral to a rear seat dummy.
Figure 5B:
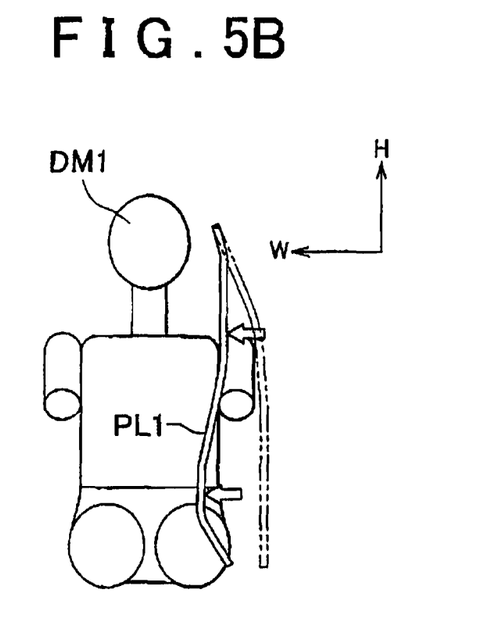
Figure 5C:
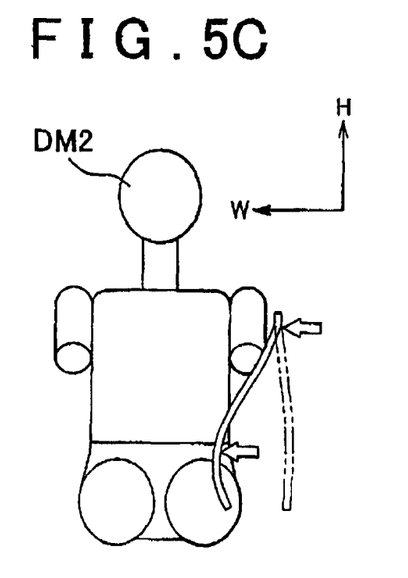
Figure 6A:
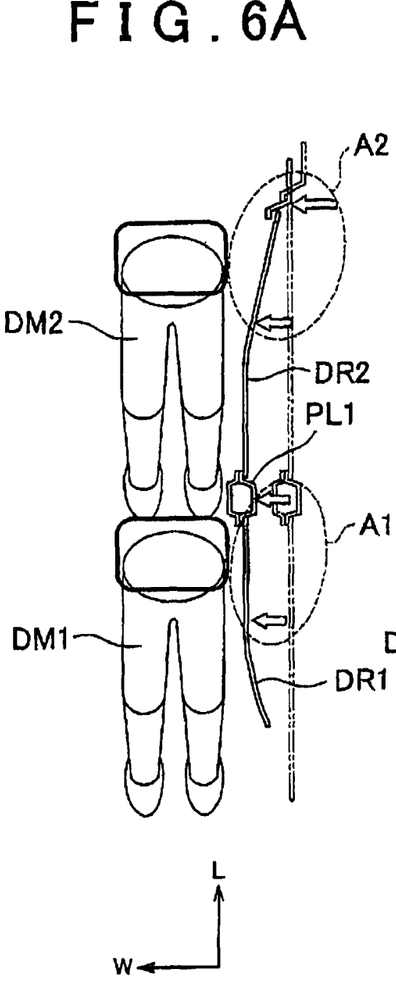
FIGS. 6A and 6B are plan views showing examples of the manner in which the vehicle structural member of the damaged vehicle deforms during an actual vehicle test, FIG. 6A showing deformation in a height position of a chest portion of the dummy and FIG. 6B showing deformation in a height position of a waist portion of the dummy.
Figure 6B:
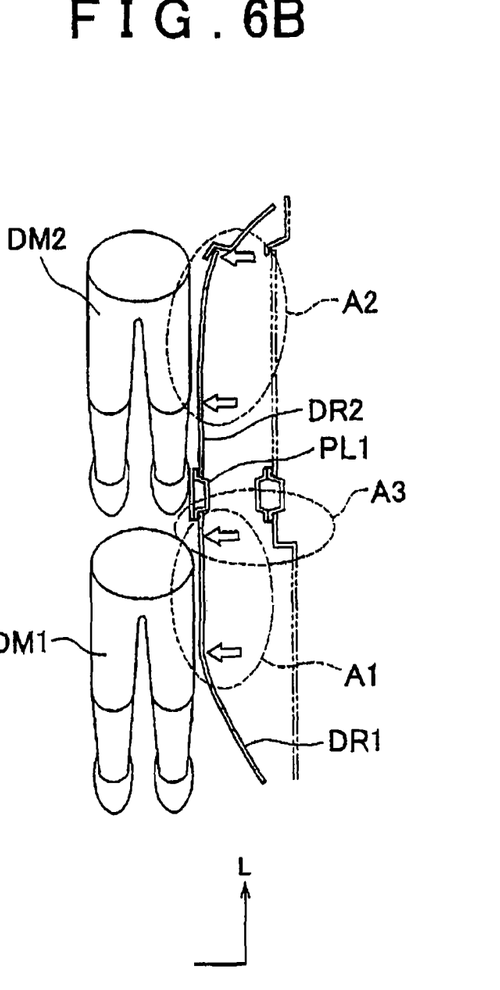

Next, referring to FIGS. 4, 5A to 5C, 6A, 6B, and 7, the behavior of the vehicle structural member in the collision test apparatus 1 will be described. FIGS. 5A to 5C and FIGS. 6A and 6B are views showing examples of the manner in which the vehicle structural member of the damaged vehicle deforms during an actual vehicle test. FIGS. 5A to 5C are front views, wherein FIG. 5A shows deformation of a front door inner DR1 lateral to a front seat dummy DM1, FIG. 5B shows deformation of a B pillar inner PL1, and FIG. 5C shows deformation of a rear door inner DR2 lateral to a rear seat dummy DM2. FIGS. 6A and 6B are plan views, wherein FIG. 6A shows deformation in the height position of the chest portion of the dummies DM1, DM2 and FIG. 6B shows deformation in the height position of the waist portion of the dummies DM1, DM2. Note that in the following description, the terms "vehicle W direction", "vehicle H axis", and "vehicle L axis" are used. The vehicle W direction indicates the vehicle lateral direction, i.e. the movement direction of the damaged vehicle (and the oncoming vehicle) during a collision. The vehicle H axis is an axis extending in the vehicle up-down direction. The vehicle L axis is an axis extending in the vehicle front-rear direction.

It is evident from FIG. 5A that a displacement difference in the vehicle up-down direction occurs in the front door inner DR1. It is evident from FIG. 5B that a displacement difference in the vehicle up-down direction occurs in the B pillar inner PL1. It is evident from FIG. 5C that a displacement difference in the vehicle up-down direction occurs in the rear door inner DR2.

It is evident from the deformation of the front door inner DR1 indicated by A1 in FIGS. 6A and 6B that a displacement difference in the vehicle front-rear direction does not occur in the front door inner DR1. It is evident from the deformation of the rear door inner DR2 indicated by A2 in FIGS. 6A and 6B that a displacement difference in the vehicle front-rear direction does not occur in the rear door inner DR2. As indicated by A3 in FIG. 6B, it is evident that a step portion existing between the front door inner DR1 and the B pillar inner PL1 prior to deformation disappears following deformation. It is therefore to be understood that the B pillar inner PL1 behaves independently of the front door inner DR1.

Figure 7:
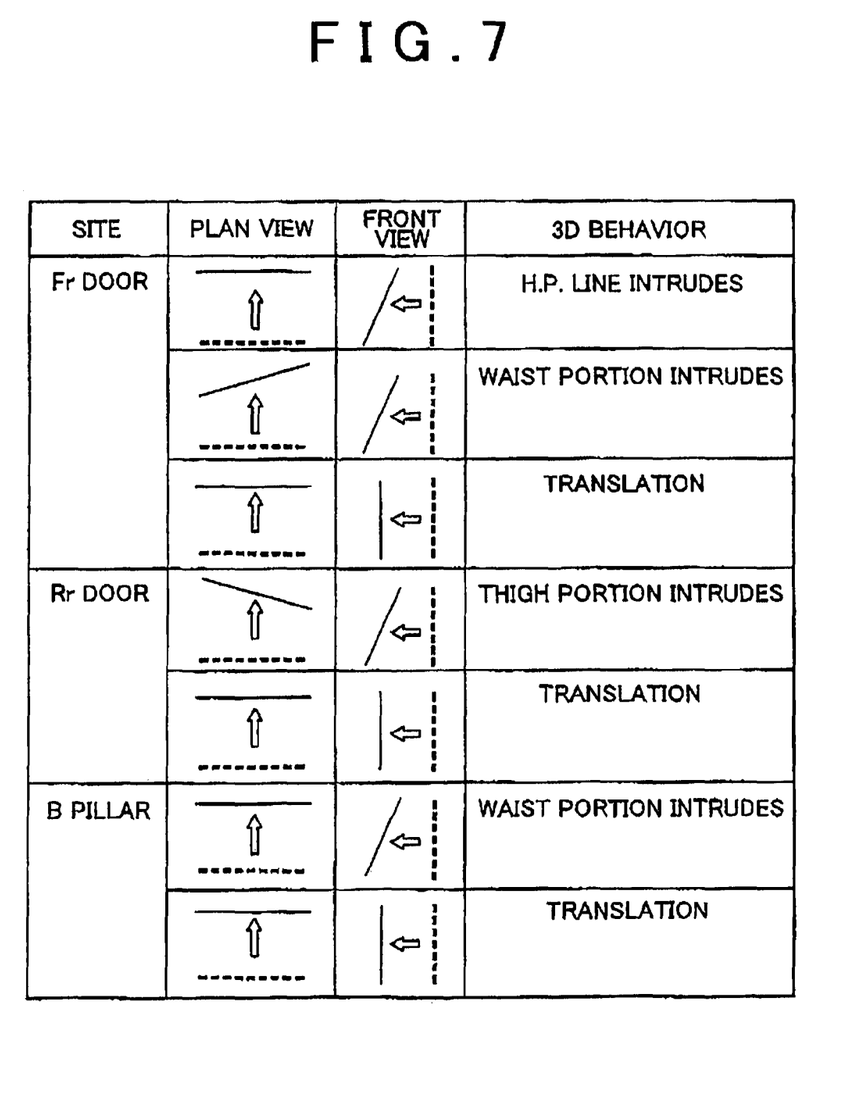
FIG. 7 is a table showing behavior of respective vehicle structural members.

After performing an actual vehicle test and evaluations as shown in FIGS. 5A to 5C and FIGS. 6A and 6B under all conceivable conditions, it was found that the respective vehicle structural members behave as shown on a table in FIG. 7. In other words, an actual vehicle test was reproduced in the collision test apparatus 1 by reproducing the behavior of the vehicle structural members shown in FIG. 7. In FIG. 7, dotted lines in "Plan View" and "Front View" sections indicate an inner panel prior to intrusion, while solid lines indicate the inner panel following intrusion. In the "Plan View" section, a left side on the paper surface indicates the vehicle front side and a right side on the paper surface indicates the vehicle rear side. In the "Front View" section, an upper side on the paper surface indicates the vehicle upper side and a lower side on the paper surface indicates the vehicle lower side. It is evident from FIG. 7 that required behavior of the door inners DR1, DR2 includes a translational motion in the vehicle W direction, a rotary motion about the vehicle H axis, and a rotary motion about the vehicle L axis. It is also evident from FIG. 7 that required behavior of the B pillar inner PL1 includes a translational motion in the vehicle W direction and a rotary motion about the vehicle L axis. It is also evident that the door inners DR1, DR2 and the B pillar inner PL1 are required to behave independently of each other.

The collision test apparatus 1 can cause the vehicle structural members to behave as shown in FIG. 7 by employing the actuator arrangement, the door simulating jig 7, the pillar simulating jig 8, and the connection structures between the actuators and the jigs shown in FIG. 4. The collision test apparatus 1 can reproduce the translational motion of the door inners in the vehicle W direction by making the driving speeds of the actuators 4A, 4B, 4C identical. The collision test apparatus 1 can reproduce the rotary motion of the door inners about the vehicle H axis using a driving speed difference between the actuator 4A and the actuator 4B, the ball joints 11A, 11B, and the sliding mechanisms 12A, 13A. The collision test apparatus 1 can reproduce the rotary motion of the door inners about the vehicle L axis using a driving speed difference between the actuator 4B and the actuator 4C, the ball joints 11B, 11C, and the sliding mechanism 13C. The collision test apparatus 1 can reproduce the translational motion of the B pillar inner in the vehicle W direction by making the driving speeds of the actuator 4D and the actuator 4E identical. The collision test apparatus 1 can reproduce the rotary motion of the B pillar inner about the vehicle L axis using a driving speed difference between the actuator 4D and the actuator 4E, the ball joints 11D, 11E, and the sliding mechanism 13E. The collision test apparatus 1 can reproduce the independent behavior of the door inners and the B pillar inner using the separated door simulating jig 7 and pillar simulating jig 8.

Figure 8:
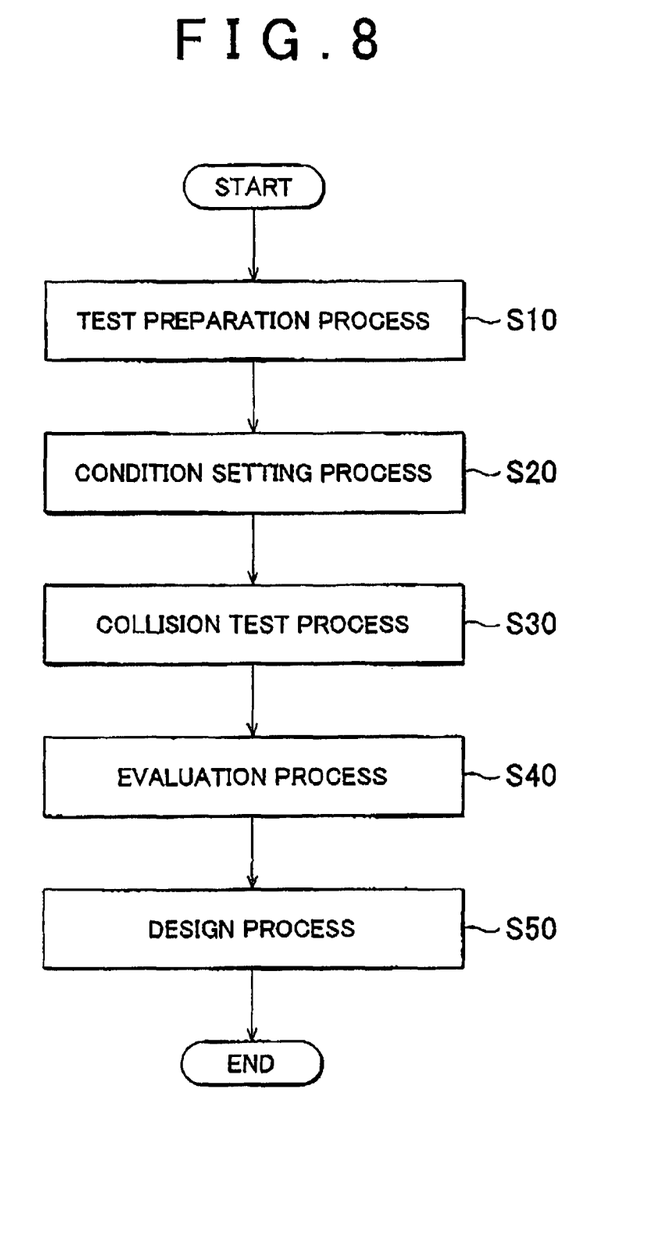
FIG. 8 is a flowchart showing a vehicle design method according to an embodiment of the invention.

Next, referring to FIG. 8, a method of designing a vehicle using the collision test apparatus 1 will be described. As shown in FIG. 8, the vehicle design method starts from a test preparation process performed on the collision test apparatus 1 (Step S10). In the test preparation process S10, the dummy DM is placed on the carrying unit 3 of the collision test apparatus 1 and the vehicle structural member is set. Next, a condition setting process is executed (Step S20). In the condition setting process S20, test conditions relating to the collision test are set. The test conditions include the movement speed of the sled carriage 2, the driving speeds of the respective actuators, and so on, for example.

Next, a collision test process is executed (Step S30). In the collision test process S30, a collision test is performed by the collision test apparatus 1 under the test conditions set in S20. In the collision test process S30, the input mechanism 20 is capable of moving the vehicle structural member at different speeds in the vehicle front-rear direction (a horizontal direction intersecting the movement direction of the vehicle structural member). More specifically, the input mechanism 20 may move the vehicle structural member such that a speed of a front side part of the vehicle structural member is higher than a speed of a rear side part or such that the speed of the rear side part of the vehicle structural member is higher than the speed of the front side part. The input mechanism 20 is also capable of moving the vehicle structural member at identical speeds in the vehicle front-rear direction. Further, the input mechanism 20 is capable of moving the vehicle structural member at different speeds in the vehicle up-down direction. More specifically, the input mechanism 20 may move the vehicle structural member such that a speed of a lower side part of the vehicle structural member is higher than a speed of an upper side part or such that the speed of the upper side part of the vehicle structural member is higher than the speed of the lower side part. The input mechanism 20 is also capable of moving the vehicle structural member at identical speeds in the vehicle up-down direction. Further, the input mechanism 20 is capable of moving the vehicle structural member by combining behaviors in the respective directions.

Next, an evaluation process is executed (Step S40). In the evaluation process S40, test results obtained in S30 are evaluated. In the evaluation process S40, a full body injury value (head, chest, abdomen, waist, and so on) of the dummy DM and the vehicle structural member are evaluated. Next, a design process is executed (Step S50). In the design process S50, a vehicle is designed on the basis of evaluation results obtained in the evaluation process S40. When the design process S50 is complete, a vehicle (the vehicle MT shown in FIG. 4, for example) designed using the design method according to this embodiment is finished, and therefore the vehicle design method shown in FIG. 8 is terminated.

Next, actions and effects of the collision test apparatus 1 will be described.

Figure 9A:
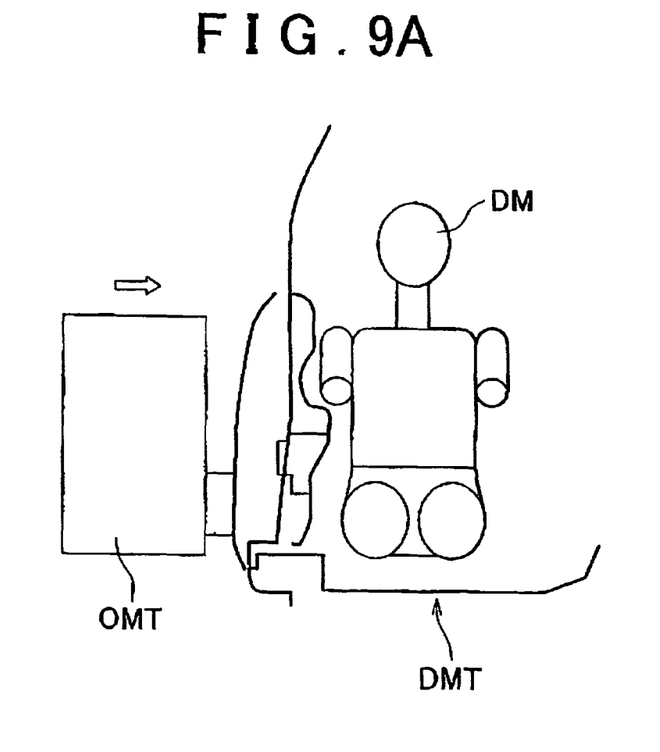
FIGS. 9A and 9B are views showing a collision simulated using actual vehicles, FIG. 9A showing a state prior to the collision and FIG. 9B showing a state following the collision.
Figure 9B:
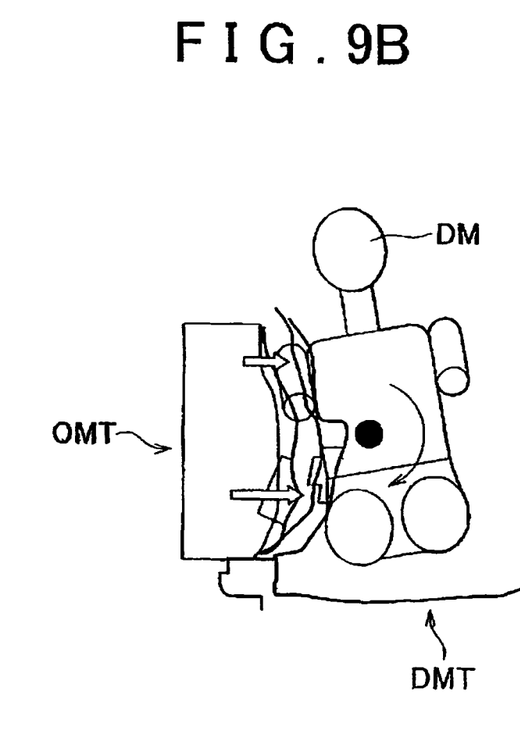

FIGS. 9A and 9B are views showing a collision simulated using actual vehicles. FIG. 9A shows a state prior to the collision, and FIG. 9B shows a state following the collision. As shown in FIGS. 9A and 9B, an oncoming vehicle OMT (which may be an actual vehicle or an MDB for use in a test) crashes side-on into a damaged vehicle DMT. The oncoming vehicle OMT includes a high-strength bumper positioned on a lower side of a vehicle body. A part of the vehicle structural member of the damaged vehicle that contacts the bumper has a higher intrusion speed than other parts. Therefore, during an actual vehicle collision, the entire vehicle body of the damaged vehicle moves when pushed by the oncoming vehicle, and the contact part between the vehicle structural member and the oncoming vehicle (or a peripheral part thereof) intrudes at different intrusion speeds in different positions.

Figure 10A:
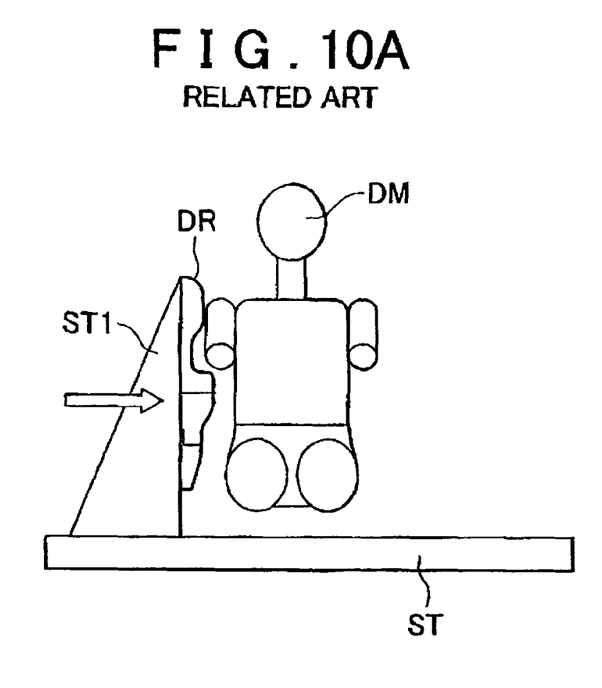
FIGS. 10A and 10B are views showing a conventional collision test apparatus, FIG. 10A showing a state prior to a collision and FIG. 10B showing a state following the collision.
Figure 10B:
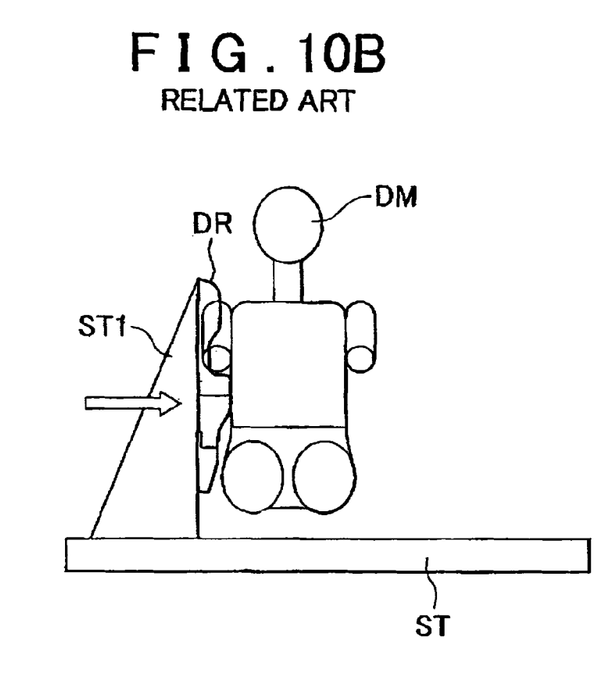

FIGS. 10A and 10B are views showing a conventional collision test apparatus. FIG. 10A showing a state prior to a collision, and FIG. 10B shows a state following the collision. The conventional collision test apparatus includes a sled carriage ST and a fixing unit ST1 provided on the sled carriage ST. A door DR serving as the vehicle structural member is fixed to the fixing unit ST1. The collision test apparatus causes the dummy DM and the door DR to collide by moving the sled carriage ST. With the conventional collision test apparatus, however, only the speed of a single location can be simulated, and therefore speed differences such as those occurring during an actual vehicle test cannot be reproduced.

The collision test apparatus 1 according to this embodiment, on the other hand, includes the actuators 4A, 4B, 4C, 4D, 4E that move the vehicle structural member toward the side of the carrying unit 3 carrying the dummy DM. The actuators 4A, 4B, 4C, 4D, 4E are provided in a plurality, and can be driven independently of each other. Accordingly, the actuators 4A, 4B, 4C, 4D, 4E are capable of moving the vehicle structural member at respectively different driving speeds. For example, when the driving speed of one actuator is high and the driving speed of another actuator is low, the intrusion speed of a location of the vehicle structural member corresponding to the former actuator increases while the intrusion speed of a location corresponding to the latter actuator decreases. In other words, the collision test apparatus 1 is capable not only of simply moving the vehicle structural member such that the vehicle structural member collides with the dummy (see FIGS. 10A and 10B, for example), but also of causing the vehicle structural member to collide with the dummy DM while moving at different speeds in different positions. As a result, a vehicle collision can be simulated at a high level of reproduction.

In the collision test apparatus 1, the dummy DM is moved to the vehicle structural member side by inertial force when the sled carriage 2 is moved. It is therefore possible to reproduce effects brought about when the entire vehicle body of the damaged vehicle moves during a collision. Further, the input mechanism 20 includes the actuators 4A, 4B, 4C, 4D, 4E that are driven to expand and contract in the movement direction D1 of the sled carriage 2. By causing the respective actuators 4A, 4B, 4C, 4D, 4E to expand at driving speeds corresponding to their positions so as to push the door simulating jig 7 and the pillar simulating jig 8, the door DR and the pillar PL serving as the vehicle structural member move to the dummy DM side at intrusion speeds corresponding to their positions. Thus, intrusion speeds in respective positions of the vehicle structural member can be reproduced. As a result, a vehicle collision can be simulated at an even higher level of reproduction.

In the collision test apparatus 1, the input mechanism 20 is capable of moving the vehicle structural member at different speeds in the vehicle front-rear direction (a horizontal direction intersecting the movement direction D1 of the vehicle structural member). As a result, a vehicle collision can be simulated at a high level of reproduction.

In the collision test process S30 of the design method according to this embodiment, the vehicle structural member moves at different speeds in a horizontal direction intersecting the movement direction D1 (the vehicle front-rear direction during a side-on collision and a vehicle left-right direction during a head-on collision or a rear collision, for example). Therefore, in the collision test process S30, a vehicle collision can be simulated at a high level of reproduction. Accordingly, more appropriate evaluations can be performed in the evaluation process S40. By executing the collision test at a high level of reproduction and performing appropriate evaluations, a vehicle exhibiting a higher level of safety can be designed. Hence, the vehicle MT designed using this design method exhibits a high level of safety.

Needless to mention, the invention is not limited to the embodiment described above.

For example, the arrangement and number of actuators in the embodiment are merely examples and may be modified. Further, in the above embodiment, a collision involving a front seat passenger was simulated, but a collision involving a rear seat passenger may also be simulated. Further, by adding a door simulating jig and an actuator to a rear side of the pillar simulating jig 8 and adding another carrying unit to the rear side of the carrying unit 3, collision tests can be performed in relation to the front seat and the rear seat simultaneously.

In the above embodiment, the carrying unit 3 is fixed to the sled carriage 2 and the dummy DM is caused to collide with the vehicle structural member by inertial force. Instead, however, the carrying unit 3 may be separated from the sled carriage and the sled carriage may be configured to move toward the stationary dummy DM.

Further, in the above embodiment, an example of a collision test envisaging a side-on vehicle collision was described, but the invention is not limited to a side-on collision, and by modifying the orientation of the carrying unit, the arrangement of the actuators, and the configuration of the jigs, a head-on collision and a rear collision may be reproduced. A collision from a diagonal direction may also be reproduced.

In the above embodiment, the vehicle structural member is fixed to the input mechanism 20 and moved at different speeds in the vehicle front-rear direction and the vehicle up-down direction. Instead, however, the vehicle structural member may be moved at different speeds in different positions by adjusting loads applied in the vehicle front-rear direction (the vehicle left-right direction during a head-on collision and a rear collision) and the up-down direction and inputting the adjusted loads into a vehicle structural member of an actual vehicle.

The invention claimed is:

1. A collision test apparatus that simulates a vehicle collision by causing a collision between a dummy and a vehicle structural member, comprising:
 a carrying unit on which the dummy is carried;
 an input unit that moves the vehicle structural member toward the carrying unit side;
 a fixing unit that fixes the vehicle structural member; and
 a ball joint that is provided on a movement direction side end portion of the input unit and connects the input unit to the fixing unit, and
 a sliding mechanism that is capable of sliding in a vehicle front-rear direction or a vehicle up-down direction and is provided in a connecting part between the input unit and the fixing unit,
 wherein the input unit is provided in a plurality, and the input units in the plurality are driven independently of each other.

2. The collision test apparatus according to claim 1, further comprising:
 a sled carriage that moves in a predetermined direction,
 wherein the carrying unit is provided on the sled carriage,
 the input unit is constituted by an actuator that is driven in the predetermined direction,
 the input unit is provided on the sled carriage, and
 the fixing unit is supported by the input unit.

3. The collision test apparatus according to claim 1, wherein the input units in the plurality include input units that are set in vehicle up-down direction positions at least at a height of a waist portion of the dummy and a height of a chest portion of the dummy.

4. The collision test apparatus according to claim 1, wherein
 the vehicle structural member is surface-supported by the fixing unit.

5. A collision test apparatus that simulates a vehicle side-on collision by causing a collision between a dummy and a vehicle structural member, comprising:
 a carrying unit on which the dummy is carried; and
 an input mechanism that moves the vehicle structural member toward the carrying unit side,
 wherein the input mechanism moves the vehicle structural member at different speeds in a horizontal direction intersecting a movement direction of the vehicle structural member,
 the input mechanism is constituted by an input unit, a fixing unit, and a sliding mechanism,
 the fixing unit fixes the vehicle structural member,
 the sliding mechanism is capable of sliding in a vehicle front-rear direction or a vehicle up-down direction and is provided in a connecting part between the input unit and the fixing unit, and
 a ball joint is provided on a movement direction side end portion of the input unit and connects the input unit to the fixing unit.

6. The collision test apparatus according to claim 5, wherein
 the vehicle structural member is surface-supported by the fixing unit.

* * * * *